United States Patent [19]

Gessner

[11] Patent Number: 5,518,393
[45] Date of Patent: May 21, 1996

[54] HOT RUNNER MANIFOLD BUSHING

[75] Inventor: Dieter Gessner, Karben, Germany

[73] Assignee: Husky Injection Molding Systems Ltd., Bolton, Canada

[21] Appl. No.: 252,446

[22] Filed: Jun. 1, 1994

Related U.S. Application Data

[63] Continuation of Ser. No. 954,323, Sep. 30, 1992, Pat. No. 5,374,182.

[51] Int. Cl.⁶ .................................................. B29C 45/23
[52] U.S. Cl. ...................... 425/549; 264/328.9; 425/562; 425/564
[58] Field of Search .................................. 425/549, 562, 425/564, 566; 264/328.9

[56] References Cited

U.S. PATENT DOCUMENTS

| | | | |
|---|---|---|---|
| 3,023,458 | 3/1962 | Seymour | 264/161 |
| 3,037,245 | 6/1962 | Darnell | 425/562 |
| 3,252,184 | 5/1966 | Ninneman | 425/561 |
| 3,716,318 | 2/1973 | Erik et al. | 425/245 |
| 3,849,048 | 11/1974 | Bielfeldt et al. | 425/247 |
| 4,043,726 | 8/1977 | Tsunemoto et al. | 425/563 |
| 4,173,448 | 11/1979 | Rees et al. | 425/549 |
| 4,657,496 | 4/1987 | Ozeki et al. | 425/562 |
| 4,705,473 | 11/1987 | Schmidt | 425/562 |
| 5,022,846 | 6/1991 | Schmidt | 425/564 |

*Primary Examiner*—Tim Heitbrink
*Attorney, Agent, or Firm*—Bachman & LaPointe

[57] ABSTRACT

The present invention relates to an apparatus for injecting molten plastic material. The apparatus includes a novel bushing arrangement have a threaded portion which forms part of a mechanical connection between the bushing and an air piston housing so as to reduce the possibility of plastic material leaking between the bushing and the air piston housing. The bushing has a melt channel for mating with a melt channel in a manifold in which the bushing is housed and with an axial channel in a nozzle body. The bushing is sized to fit within a bore in the manifold so as to reduce the possibility of leakage between the bushing and the manifold. The bushing also serves to close off or plug holes or channels drilled into the manifold. In one embodiment of the present invention, the bushing has a passageway through which a valve stem for closing off a gate in the nozzle body passes.

3 Claims, 5 Drawing Sheets

HOT RUNNER MANIFOLD BUSHING

This is a continuation, of application Ser. No. 954,323 filed Sep. 30, 1992 now U.S. Pat. No. 5,374,182.

BACKGROUND OF THE INVENTION

The present invention relates to an apparatus for injecting molten plastic material into a molding machine and in particular, to an improved bushing arrangement to be incorporated into the injection apparatus.

FIG. 1 illustrates a manifold bushing construction 30 for an injection molding apparatus having a conventional thermal expansion sealing nozzle 32. This type of injection molding apparatus and manifold bushing construction is illustrated in detail in U.S. Pat. No. 4,173,448 to Rees et al.

Subsequent to the development of the thermal expansion sealing nozzle, the spring sealing nozzle was developed. FIG. 2 illustrates a molding system with such a spring sealing nozzle. The substitution of the spring sealing nozzle for the thermal expansion sealing nozzle brought one major problem along with it—namely, a leakage problem. The cause of this problem can be traced to the fact that it is very difficult to manufacture manifold bushing spigots with a length that exactly matches the depth of the corresponding recess in the manifold. Consequently a very small gap may exist at the interfaces 10 and 12. Furthermore, the diameter of the spigot 14 has to be slightly smaller than the bore in between the interfaces 10 and 12. When this happens, the plastic, which is subjected to injection pressure, exerts a large separating force at the interfaces 10 and 12 by virtue of the comparatively large projected areas on which it can act. This separating force can overcome the spring force trying to maintain the seal at the interface and leakage can occur.

Other prior art arrangements of manifold bushing and nozzle assemblies face still other problems. For example, U.S. Pat. No. 5,022,846 to Schmidt shows a nozzle and a manifold bushing screwed together through the manifold with bolts. This construction means that when the manifold thermally expands laterally, the nozzle must travel laterally as well or deflect, thereby causing premature wear and the possibility of leakage.

U.S. Pat. No. 4,043,726 to Tsunemoto shows a construction having a spring loaded nozzle assembly with an adjustable set screw. The valve stem and the valve action are within the nozzle body. Injection pressure opens the valve and spring pressure closes it. Lateral thermal expansion takes place along the connecting pipe as it slides inside the nozzle body. The disadvantage of this method is that a double acting air operated valve stem is difficult to incorporate in this design. The publication "The Heat-Lock distribution system" by Nil Helldin AB of Sweden illustrates a similar system.

Finally, it is known in the art that it is often necessary to block hot runner channels in a manifold. This is because the manifold 20 has several drilled channels, the ends of which have to be plugged in order to obtain a desired flow path. FIG. 3 illustrates a plugging system used in connection with one such manifold to ensure a safe, leak free manifold. In this system, the end of a hole 22 in the manifold is tapered and threaded. Then a tapered plug 24 is fitted and inserted and held in place with a threaded set screw 26. The inside of the plug 24 is machined in place to match the contour of the channel. On a multicavity manifold, this procedure is both time consuming and expensive. In order to clean out the channels, each plug has to be removed and new ones installed and machined in place.

U.S. Pat. No. 3,849,048 to Bielfeldt shows a hydraulically actuated piston housing that takes up the cold clearance to prevent leakage. This piston acts like a spring. Inside the housing is a second hydraulic piston which drives the valve stem. The nozzle body is threaded into the manifold insert and therefore thermally expands laterally when the manifold expands. The close proximity of flammable hydraulic oil to the heated manifold means that there is a great risk of fire with this design after the seals have worn.

U.S. Pat. No. 3,716,318 to Erik shows a combined nozzle/manifold bushing piece which is inserted through the manifold from the underside and is retained by a threaded piston housing. This construction is also disadvantageous in that the nozzle assembly must travel laterally with the manifold as it thermally expands.

U.S. Pat. No. 3,252,184 to Ninneman shows a manifold bushing piece inserted through the manifold and butted against the spigotted end of the nozzle body. Because the nozzle body is spigotted to the manifold, it must travel laterally when the manifold thermally expands.

U.S. Pat. No. 3,023,458 to Seymour illustrates a one piece manifold bushing and nozzle body inserted through the manifold. The valve stem is closed with a spring and opened via injection pressure. The nozzle end of the bushing appears to be located in a recess in the mold cavity plate and clearly cannot accommodate lateral thermal expansion of the manifold plate with respect to the cavity plate. In effect, bending occurs which would tend to cause the valve stem to bind.

Accordingly, it is an object of the present invention to provide an improved apparatus for injecting plastic material wherein the possibility of having leakages of the plastic material is significantly reduced.

It is a further object of the present invention to provide an apparatus as above wherein lateral expansion of a manifold is not transmitted to a nozzle assembly through which said plastic material flows.

It is still a further object of the present invention to provide an apparatus as above wherein the need to plug holes in a manifold is performed in a simpler and less expensive fashion.

It is yet a further object of the present invention to provide an improved bushing arrangement which has utility in valve gated applications and in non-valve gated applications.

Still other objects and advantages of the present invention will become more apparent from the following description and drawings in which like reference numerals depict like elements.

SUMMARY OF THE INVENTION

The foregoing objects and advantages are attained by the plastic material injection apparatus and bushing arrangement of the present invention. The plastic material injection apparatus of the present invention includes an air piston housing, a manifold bushing for locating the air piston housing, and means for mechanically joining the manifold bushing to the air piston housing so as to minimize the possibility of plastic material leakage between the manifold bushing and the air piston housing. In a preferred embodiment of the present invention, the mechanical joining means comprises a threaded portion on the manifold bushing and a mating nut arrangement for joining the air piston housing to the manifold bushing.

The apparatus further includes a manifold through which plastic material flows. The manifold bushing has a mating channel for transmitting the plastic material from the manifold to an axial channel in a nozzle body. At least one dowel is provided to adjust the location of the manifold bushing so that a first melt channel in the manifold is aligned with the mating melt channel in the manifold bushing. In addition to the melt channel, the manifold bushing has a first portion which contacts the underside of the manifold, a second portion which is dimensioned to fit within a bore in the manifold and to be substantially coextensive with said bore, and a third portion which includes said threaded portion. It has been found that one advantage to the manifold bushing arrangement of the present invention is that it also serves to plug any other channels or bores within the manifold.

Still further, the apparatus of the present invention includes a nozzle body which is independent of the manifold so that lateral expansion of the manifold is not transmitted to the nozzle body. The nozzle body may or may not include a valve gate arrangement.

Still other features of the present invention are set forth in the following detailed description.

DETAILED DESCRIPTION

Figure 1:
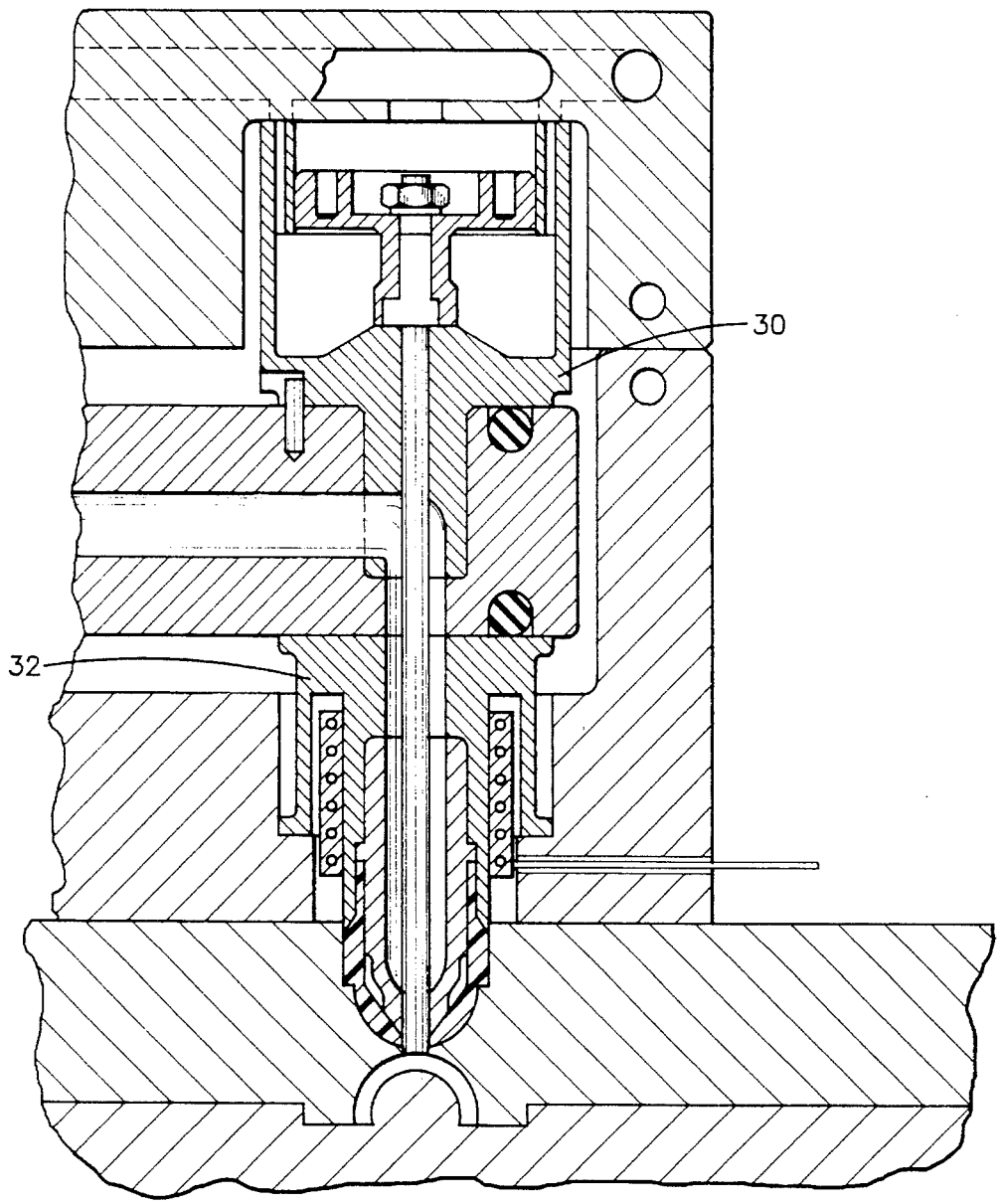
FIG. 1 illustrates a prior art bushing construction for an injection molding apparatus.
Figure 3:
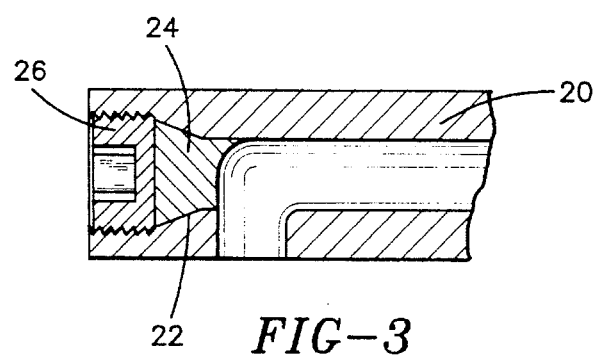
FIG. 3 illustrates a prior art plugging system.
Figure 2:
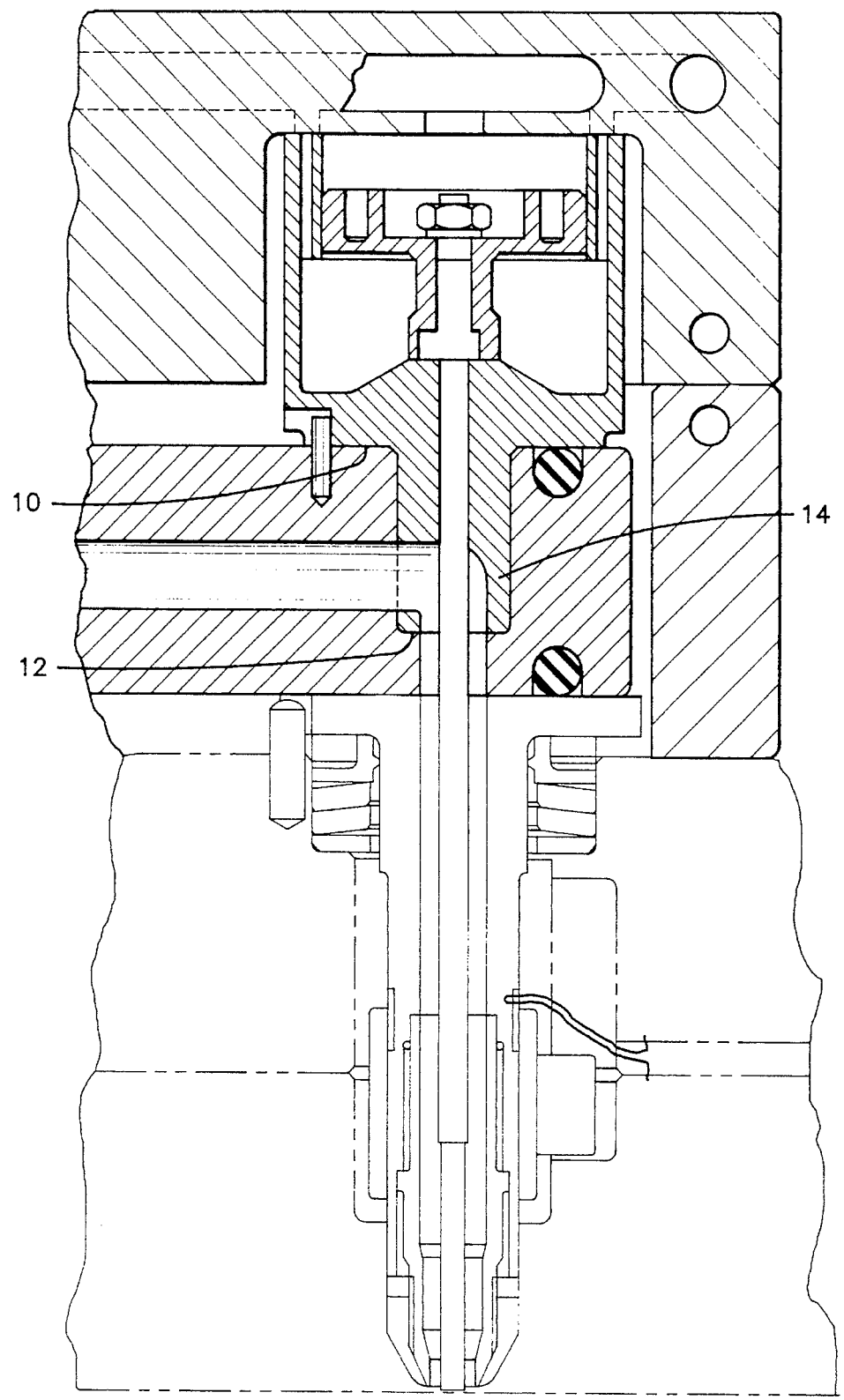
FIG. 2 illustrates a prior art injection molding apparatus having a spring sealing nozzle.
Figure 4:
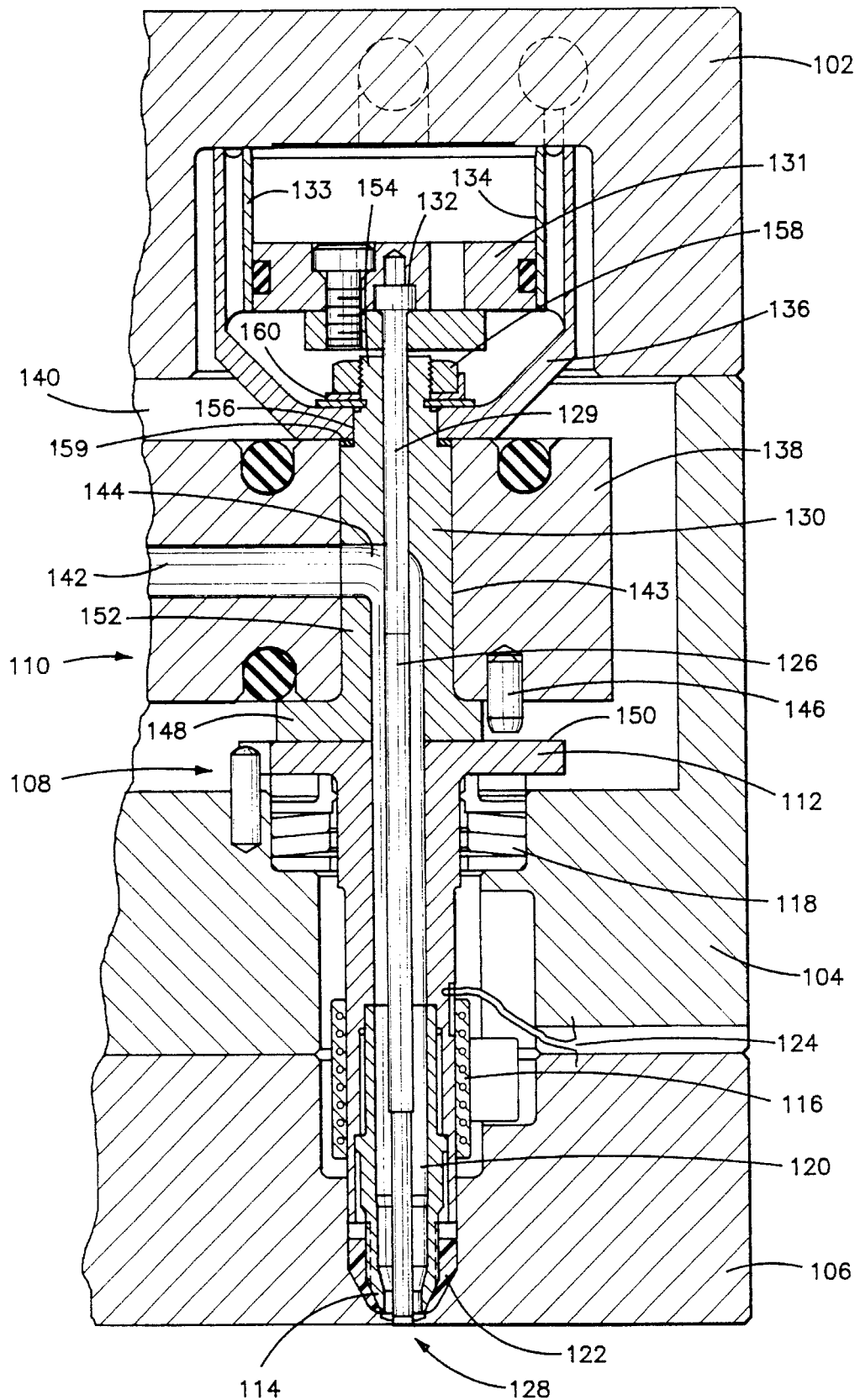
FIG. 4 illustrates a plastic material injection apparatus having the improved bushing arrangement of the present invention.

Referring now to FIG. 4, a hot runner valve gate system for injecting plastic material into a mold or the like is illustrated. The system includes a manifold backing plate 102, a manifold plate 104, and a mold plate 106. The system further includes a nozzle assembly 108 for introducing molten plastic material into a mold (not shown) and a manifold/bushing arrangement 110 for allowing communication of plastic material from a source (not shown) to the nozzle assembly.

As shown in FIG. 4, the nozzle assembly 108 consists of a nozzle body 112, a tip 114, a heater 116 and springs 118. The purpose of the springs 118 will be discussed hereinafter. The nozzle body 112 is typically made of steel, while the tip 114 may be formed from any suitable highly heat-conductive material known in the art such as beryllium/copper. The nozzle body has an axial channel 120 through which molten plastic material flows. The tip 114 surrounds a terminal part of the axial channel 120. If desired, the nozzle tip may include a sheath 122 for thermally insulating the downstream end of the nozzle tip from the relatively cold mold plate 106. The sheath 122 may be formed from a resinous material which may be prefabricated. Alternatively, the sheath 122 may be formed from an overflow of injected resin in the first operating cycle or cycles.

The heater 116 may be any suitable electric heater known in the art to which current is admitted by way of a cable 124. As shown in FIG. 4, the heater surrounds a portion of the nozzle body.

A valve stem 126 is provided to permit opening and closing of the gate 128 in the nozzle body. The valve stem may be formed by a steel rod which extends through a passageway 129 in the bushing 130 and into the nozzle body 112. As can be seen from FIG. 4, the passageway 129 mates with a melt channel 144 in the bushing 130. The end of the valve stem opposite to the gate 128 is connected to a piston head 131 by a screw and clamp arrangement 132.

The piston head 131 is housed within a cylinder chamber formed by end walls 133 and 134 of an air piston housing 136 and the plate 102. Downstroke of the piston causes the valve stem to move into a position whereat it closes or reduces the cross sectional area of the gate 128 so as to restrict flow of the molten plastic material. Upstroke of the piston causes the valve stem to move so as to increase flow of the molten plastic material through the gate 128.

As previously discussed, the valve gate system of the present invention also includes a manifold/bushing arrangement consisting of the manifold 138 and the bushing 130. The manifold 138 is formed by a distribution plate housed between the plates 102 and 104 but separated therefrom by an air gap 140. The manifold includes a melt channel 142 forming part of the hot runner system for transporting molten plastic material from a source (not shown) to the gate 128 associated with a respective mold or molds. The manifold further includes a bore 143 into which the bushing 130 is inserted. The manifold may be formed from any suitable metal or heat conducting material known in the art.

The bushing 130 is known as a manifold bushing. It surrounds a portion of the valve stem 126. The manifold bushing is formed from any suitable material known in the art (usually steel) and is designed to be inserted through the manifold 138 from the underside. As shown in FIG. 4, the melt channel 144 in the bushing mates with the channel 142 in the manifold and the axial channel 120 in the nozzle assembly. One or more dowels 146 are provided to facilitate alignment of the manifold 138 and the bushing 130 so that the channels 142 and 144 are in alignment with each other.

The bushing 130 has a first or lower portion 148 which is located between the underside of the manifold 138 and an upper surface 150 of the nozzle body. The bushing further has a second or central portion 152 which has an outside diameter substantially equal to the diameter of the bore 143 in the manifold 138. Still further, the bushing has a third or upper portion 154 which is threaded along at least part of its extent.

As shown in FIG. 4, the third portion 154 of the bushing extends through an aperture 156 in the air piston housing. A nut 158 is provided to mechanically join the bushing 130 to the air piston housing 136. If desired, one or more washers and/or locking washers 160 may be inserted between a surface of the nut 158 and a surface of the air piston housing 136 to insure a good mechanical connection between the air piston housing and the bushing. By holding the valve bushing 130 and the air piston housing tightly with the nut 158, there is no possibility of leakage. A steel O-ring 159 is provided to further reduce the possibility of leakage of the plastic material up the sidewall of bore 143.

The springs 118 deflect as the nozzle body 112 and the air piston housing 136 expand due to increases in temperature. In accordance with the present invention, the springs 118 cause a spring action in the nozzle assembly. It should be noted however that any action caused by the springs 118 on the nozzle body 112 is completely independent of any sealing action between the manifold bushing 130 and the manifold 138 and between the manifold bushing 130 and the air piston housing 136.

It has been found that this arrangement of parts is quite advantageous. For example, the manifold bushing 130, the air piston assembly and the valve stem 126 are located and held firmly by the manifold 138. Still further, this arrangement helps reduce the possibility of plastic material leakage between the manifold bushing 130 and the air piston housing 136 and between surfaces of the bushing 130 and the manifold 138. This approach also eliminates the need for a cold clearance and overcomes the need for very closely toleranced components in order to avoid plastic leakage.

Another principal advantage of the system of the present invention is the avoidance of lateral travel or expansion of the nozzle body 112 due to lateral expansion of the manifold 138. Lateral expansion of the manifold occurs due to thermal contact with the molten plastic material and due to heat from the heater(s) 116. In the system of the present invention, this lateral expansion will be transmitted to the manifold bushing 130 but not to the nozzle body 112. Instead, the nozzle body and the nozzle assembly will remain substantially or entirely stationary as the manifold 138 and the bushing 130 slide relative to and across the upper surface 150 of the nozzle body.

Figure 5:
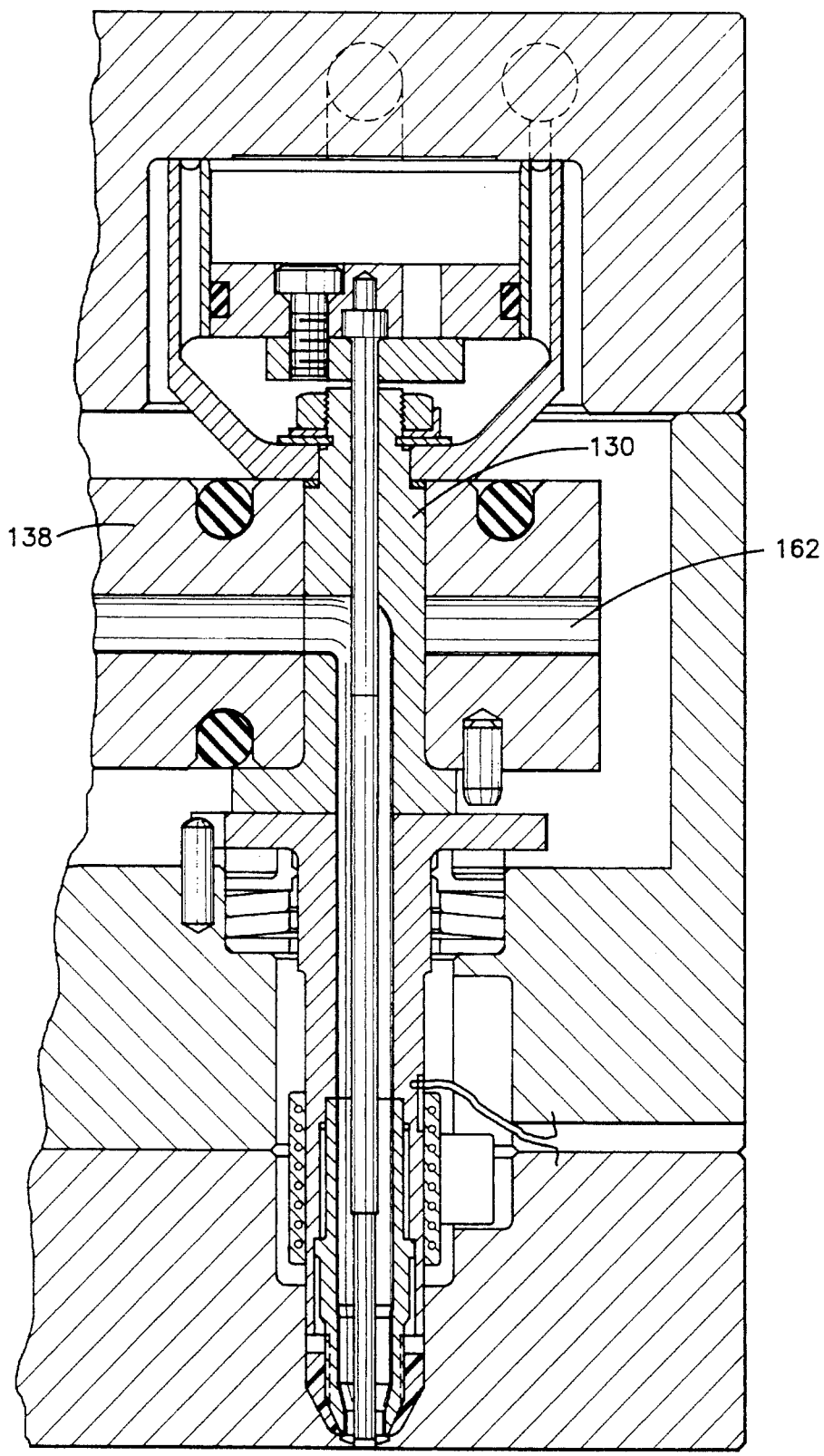
FIG. 5 illustrates the bushing arrangement of FIG. 4 blocking a through hole in a manifold in which it is housed.

FIG. 5 illustrates yet another advantage to the design of the present invention. Manifolds typically have more than one hot runner channel 162. The ends of those channels not in use must be plugged in order to obtain a desired flow path. In the past, expensive plugging systems were used to insure a safe, leak free manifold having the desired flow path. As can be seen from FIG. 5, the bushing 130 of the present invention eliminates the need for such plugging systems. Since the bushing 130 extends virtually the entire width of the manifold and has a channel which mates with a desired melt channel for establishing a desired flow path in the manifold, there is no need to plug any other channel or channels 162 within the manifold.

Figure 6:
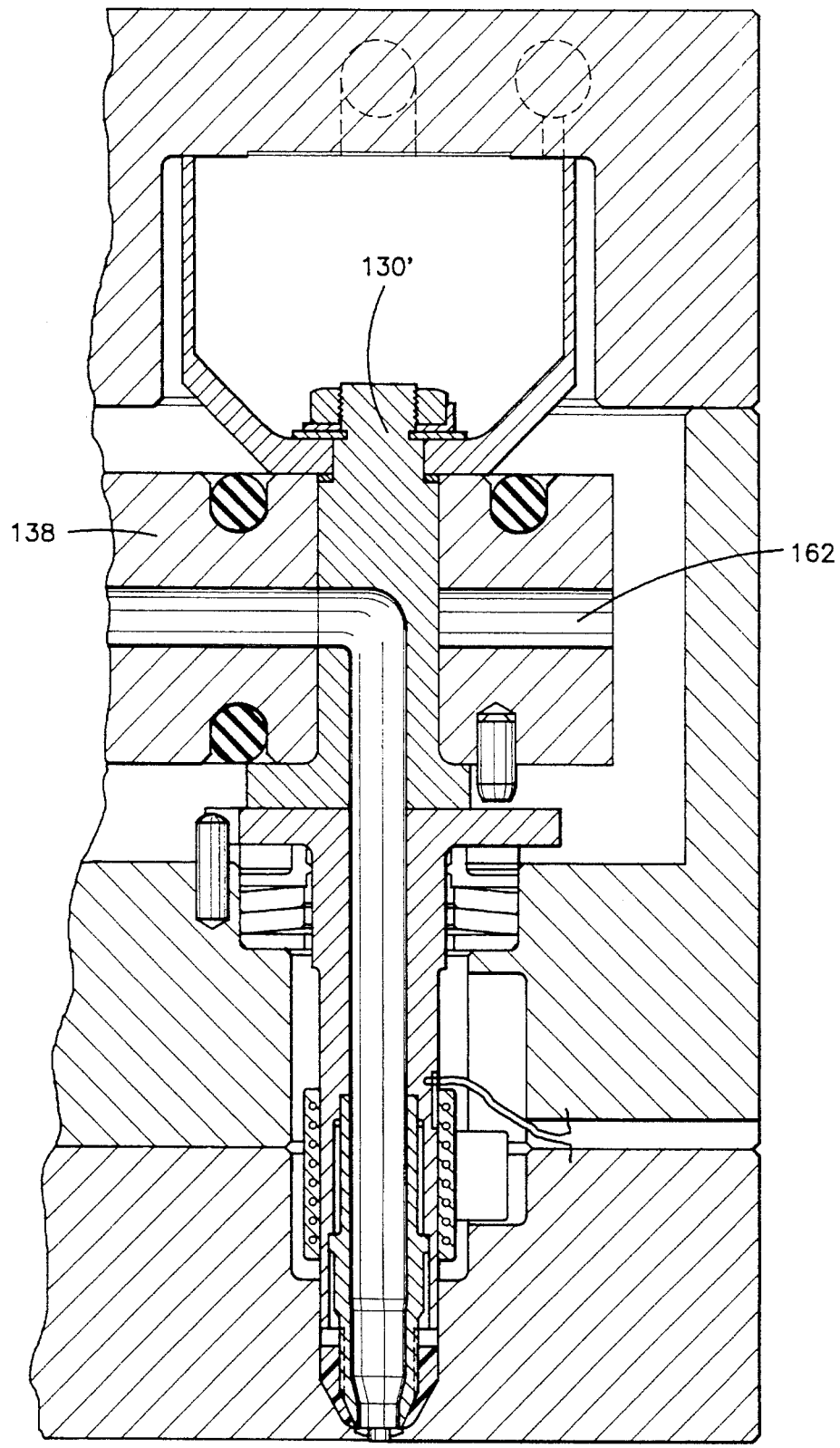
FIG. 6 illustrates the bushing arrangement of the present invention in a non-valve gated injection apparatus.

While the bushing arrangement of the present invention has been discussed in the context of a valve gated hot runner system, FIG. 6 illustrates how substantially the same bushing can be incorporated into a non-valve gated system. This type of system is identical to the one shown in FIG. 4 with the principal exception that the bushing 130' lacks a passageway for a valve stem. Thus, it is possible that a valve gated manifold can be converted to a non-valve gated one without any modification to the manifold itself. As a result of this, manifolds can be standardized regardless of gate type and can be made faster and cheaper since plugging of the holes is no longer required. Additionally, cleaning out the channels in the manifold is also more convenient since no machining in place of new plugs is required.

It is apparent that there has been provided in accordance with this invention a hot runner manifold bushing which fully satisfies the objects, means, and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications and variations as fall within the spirit and broad scope of the appended claims.

What is claimed is:

1. An apparatus for injecting molten plastic material into a mold, said apparatus comprising:

a manifold having a melt channel in communication with a source of plastic material;

a bushing having a melt channel for mating with said melt channel in said manifold, said bushing being positioned within a bore in said manifold and contacting sidewalls of said bore along substantially the entire length of the bore;

said bushing having a first portion adjacent a lower portion of said manifold, said first portion having a diameter greater than the diameter of the bore in which said bushing is positioned;

a nozzle assembly for injecting plastic material into said mold, said nozzle assembly having an upper surface which abuts a lower surface of said first portion and an axial channel which mates with said melt channel in said bushing; and means cooperating with said bushing for causing said first portion to seal against an underside of said manifold so as to reduce plastic leakage between said bushing and said manifold.

2. The apparatus of claim 1 further comprising:

said manifold being subject to lateral expansion which causes said manifold to slide relative to a surface of said nozzle assembly;

said bushing travelling with said manifold as said manifold expands; and said nozzle assembly remaining substantially stationary when said manifold and said bushing slide relative to said nozzle assembly surface.

3. The apparatus of claim 2 further comprising:

a valve member passing through said bushing;

a piston assembly associated with said valve member for causing said valve member to move between open and closed positions;

said piston assembly travelling with said manifold and said bushing during said lateral expansion so as to substantially avoid plastic leakage between said manifold and said bushing.

* * * * *